(12) United States Patent
Clark

(10) Patent No.: US 9,045,854 B2  
(45) Date of Patent: Jun. 2, 2015

(54) CLOTHES DRYER

(76) Inventor: Johnnie Clark, Mesa, AZ (US)

(*) Notice: Subject to any disclaimer, the term of this patent is extended or adjusted under 35 U.S.C. 154(b) by 835 days.

(21) Appl. No.: 13/278,150

(22) Filed: Oct. 20, 2011

(65) Prior Publication Data

US 2012/0096739 A1 Apr. 26, 2012

Related U.S. Application Data

(60) Provisional application No. 61/394,885, filed on Oct. 20, 2010.

(51) Int. Cl.
- *F26B 3/00* (2006.01)
- *D06F 58/02* (2006.01)
- *D06F 58/22* (2006.01)
- *D06F 58/24* (2006.01)
- *D06F 58/28* (2006.01)

(52) U.S. Cl.
CPC ............... *D06F 58/02* (2013.01); *D06F 58/22* (2013.01); *D06F 58/24* (2013.01); *D06F 58/28* (2013.01); *D06F 2058/2816* (2013.01); *D06F 2058/2864* (2013.01)

(58) Field of Classification Search
CPC ........ D06F 58/22; D06F 58/24; F26B 25/007
USPC ........ 34/82, 480, 85, 73, 75, 79; 68/20, 18 C, 68/18 F
See application file for complete search history.

(56) References Cited

U.S. PATENT DOCUMENTS

| | | | | |
|---|---|---|---|---|
| 2,865,620 | A * | 12/1958 | Woodland | 261/121.1 |
| 7,409,776 | B2 * | 8/2008 | Ono et al. | 34/77 |
| 7,513,132 | B2 * | 4/2009 | Wright et al. | 68/18 F |
| 8,182,612 | B2 * | 5/2012 | Grunert | 134/34 |
| 8,418,376 | B2 * | 4/2013 | Steffens et al. | 34/72 |
| 2005/0252022 | A1 * | 11/2005 | Tyau | 34/82 |
| 2006/0218812 | A1 * | 10/2006 | Brown | 34/86 |
| 2010/0139111 | A1 * | 6/2010 | Favret et al. | 34/76 |
| 2011/0005096 | A1 * | 1/2011 | Stolze | 34/468 |
| 2011/0209293 | A1 * | 9/2011 | Ghosh et al. | 8/142 |

* cited by examiner

*Primary Examiner* — David J Laux
(74) *Attorney, Agent, or Firm* — Schmeiser, Olsen & Watts LLP

(57) ABSTRACT

A clothes dryer is provided, the dryer comprising a drum, an intermediate air channel, a lint compartment, a lint collector, an outlet pipe, a moisture trap and pump, a heating element, and a fan, these several components being coupled together and defining a closed loop wherein air flows through the loop in response to operation of the fan. Upon operation of the dryer, the fan begins to force air through the closed loop and the heating element heats the air to within a predetermined temperature range at which point the heating element turns off and the dryer operates to dry the clothes by recycling the heated air through the closed loop over and over again until the clothes within the dryer are dry. Should the air temperature within the loop fall below the predetermined range, the heating element can intermittently activate to heat the air back to within the range.

13 Claims, 3 Drawing Sheets

CLOTHES DRYER

CROSS REFERENCE TO RELATED APPLICATION[S]

This application claims priority to U.S. Provisional Patent Application to Clark, entitled "CLOTHES DRYER," Ser. No. 61/394,885, filed Oct. 20, 2010, the disclosure of which is hereby incorporated entirely herein by reference

BACKGROUND OF THE INVENTION

1. Technical Field

This invention relates generally to clothes dryers, and in particular to an energy-efficient clothes dryer.

2. State of the Art

A clothes dryer is a useful household appliance that is useful in removing moisture from clothing and other textiles usually after the clothing has been washed in water.

A traditional clothes dryer operates by continuously pulling in cool, dry, ambient-air surrounding the dryer and heating it before passing it through the tumbler where the clothes are located. As the heated air passes over the wet clothing, the moisture within the clothing evaporates into the heated air, thus drying the clothes. The resulting hot, humid air is vented back out into the ambient air, usually to the ambient air outside the home or dwelling in which the dryer is operating, to allow the dryer to continue to pull the cool, dry inside air over the heating element to continue the drying process.

Because the traditional dryer must continuously raise the temperature of the ambient air entering the dryer to a higher temperature to operate effectively, it must necessarily consume a substantial amount of energy to do so. This is inherently inefficient. Also, traditional dryers provide a constant air flow through the dryer to dry the clothes and fail to adjust the air flow based on the individual load within the dryer, which wastes the power supplied to the motor and heating element.

In view of the above, and in view of the movement toward "greener" appliances, there is a need for a clothes dryer that addresses the above-mentioned problems to operate more efficiently and cost-effectively.

DISCLOSURE OF THE INVENTION

The present invention relates to clothes dryers, and in particular to an energy-efficient clothes dryer.

An aspect of the present invention includes a dryer comprising a drum, an intermediate air channel, a lint compartment, a lint collector, an outlet pipe, a moisture trap and pump, a heating element, and a fan, these several components being coupled together and defining a closed loop wherein air flows through the closed loop in response to operation of the fan. Upon operation of the dryer, the fan begins to force air through the closed loop and the heating element heats the air to within a predetermined temperature range at which point the heating element turns off and the dryer operates to dry the clothes by recycling the heated air through the closed loop over and over again until the clothes within the dryer are dry. Should the air temperature within the closed loop fall below the predetermined range, the heating element can activate to heat the air back to within the range.

Another aspect of the present invention includes the lint collector within the lint compartment that functions as both a lint filter and a steam condenser as the moist hot air exiting the drum of the dryer flows through the lint collector. The lint compartment, in conjunction with the lint collector, not only retains the lint that flows out of the drum, but also collects the moist air to the point that water droplets form within the lint compartment and subsequently fall onto a lower surface of the lint compartment and are channeled toward the outlet pipe that guides the water droplets to the moisture trap that collects the water. The collected water is then removed from the closed loop by the operation of the pump. By removing at least some of the moisture from the air within the closed loop, the dryer is able to retain the heat of the air and continue to pull moisture out of the load of clothing to be dried.

Another aspect of the present invention includes steam drying the load of clothing. Steam drying the clothing allows kills of bacteria and also extracts less lint from the clothing within the dryer. Whereas traditional clothes dryers cause clothing to excessively shed lint, drying the load of clothing by steam does not.

Another aspect of the present invention includes an air flow sensor within the closed loop that measures the flow of air. Based on the measurement, the fan speed can be adjusted. For example, for light loads, for loads with little lint, or for relatively dry loads, the fan does not have to work as hard to maintain the requisite air flow through the closed loop to properly dry the clothes. As a result, the fan speed can be reduced, thus diminishing the consumption of energy to power the fan. On the other hand, where the load in the drum is large or substantially wet, the fan may adjust its power consumption to adjust its rotational speed to maintain the requisite air flow through the closed loop. In this way, the dryer of the present invention supplies the appropriate power to the fan when it is needed, but also conserves power to the fan when it is not needed.

Another aspect of the present invention includes a scented bag that functions as the lint collector, the scented bag being replaceable as needed.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to clothes dryers, and in particular to an energy-efficient clothes dryer.

Figure 1:
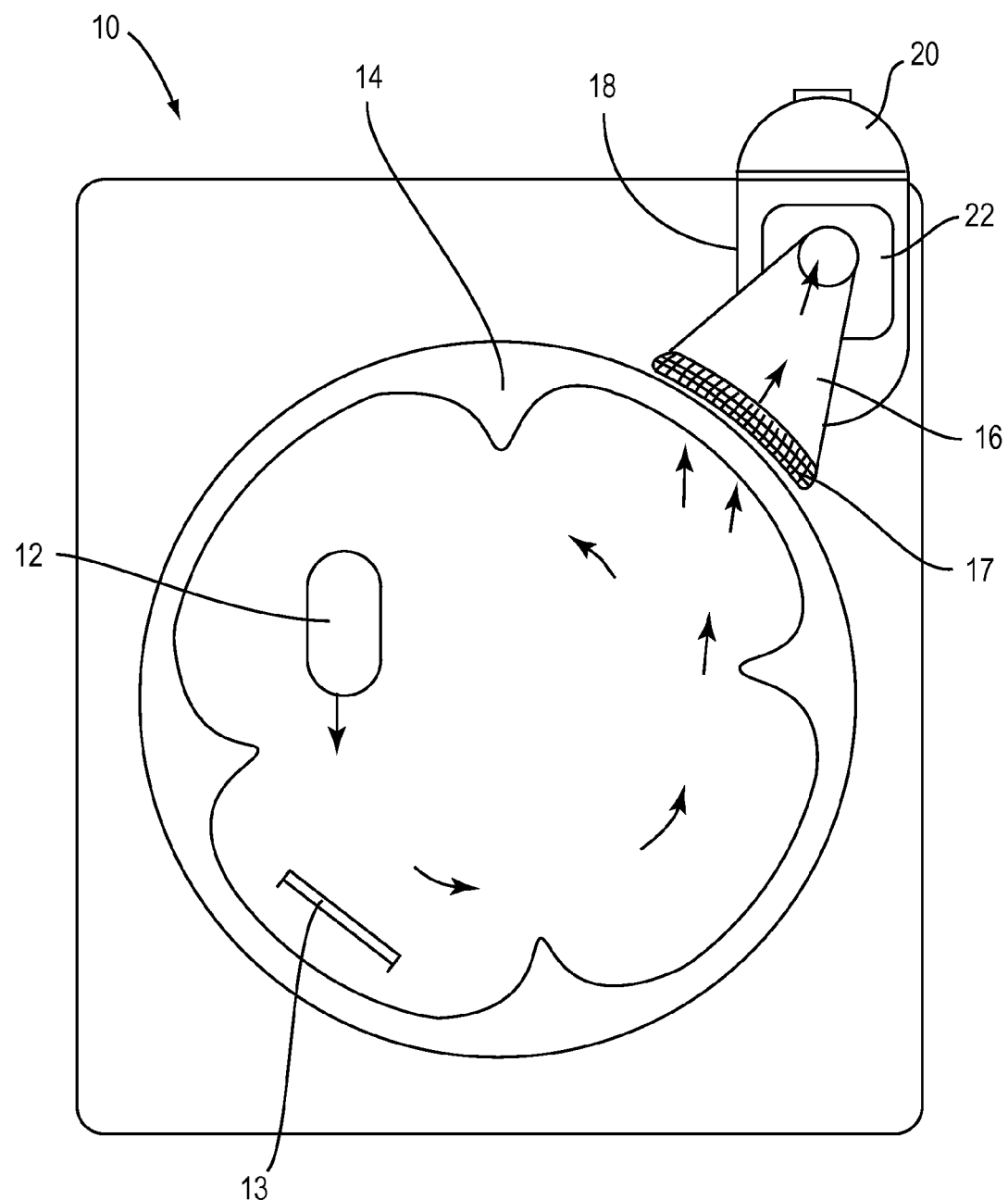
FIG. 1 is a front cross-sectional view of the clothes dryer in accordance with the present invention.

As shown in FIG. 1, the clothes dryer 10 comprises a drum 14 having an air inlet 12, the drum 14 being capable of holding and rotating a load of laundry, typically clothing. When a load of clothing is added to the drum 14, the door to the drum 14 is closed and the dryer 10 can be activated. By closing the door to the drum 14, a closed loop within the dryer 10 is air-tightly sealed and the dryer 10 can begin its intended operation. Once activated, the drum 14 begins to rotate to agitate the clothing therein. A fan 32, to be discussed in further detail below, begins to force air within the individual components of the closed loop through the dryer 10. Parts of the closed loop include, but are not limited to, the drum 14, a lint compartment 18, an outlet pipe 28, and the fan 32. Air within the closed loop, shown by arrows in FIG. 1, is introduced into the drum 14 by way of the air inlet 12, and the air circulates within the drum 14 in and around the clothing. The air serves to dry the clothes until the clothes are dry and/or the dryer 10 finishes its programmed cycle.

Adjacent to the drum 14 is intermediate air channel 16, which couples the interior air space of the drum 14 to the lint compartment 18, to be discussed in further detail below. After the air passes through the clothing in the interior of the drum 14, the air is drawn into the intermediate air channel 16 and subsequently into the lint compartment 18. Between the drum 14 and the intermediate air channel 16 is positioned filter 17. Filter 17 consists of a semi-permeable barrier made of connected strands of metal, fiber, or other flexible/ductile material. Filter 17 is similar to a web or net in that it has many attached or woven strands that are close enough to one another to prevent articles of clothing or other smaller-sized particles (i.e., buttons, coins) from entering into the intermediate air channel 16. However, the strands in filter 17 are far enough apart to allow the air within the drum 14 to freely flow through the strands without noticeable restriction or reduced air flow speed.

Figure 2:
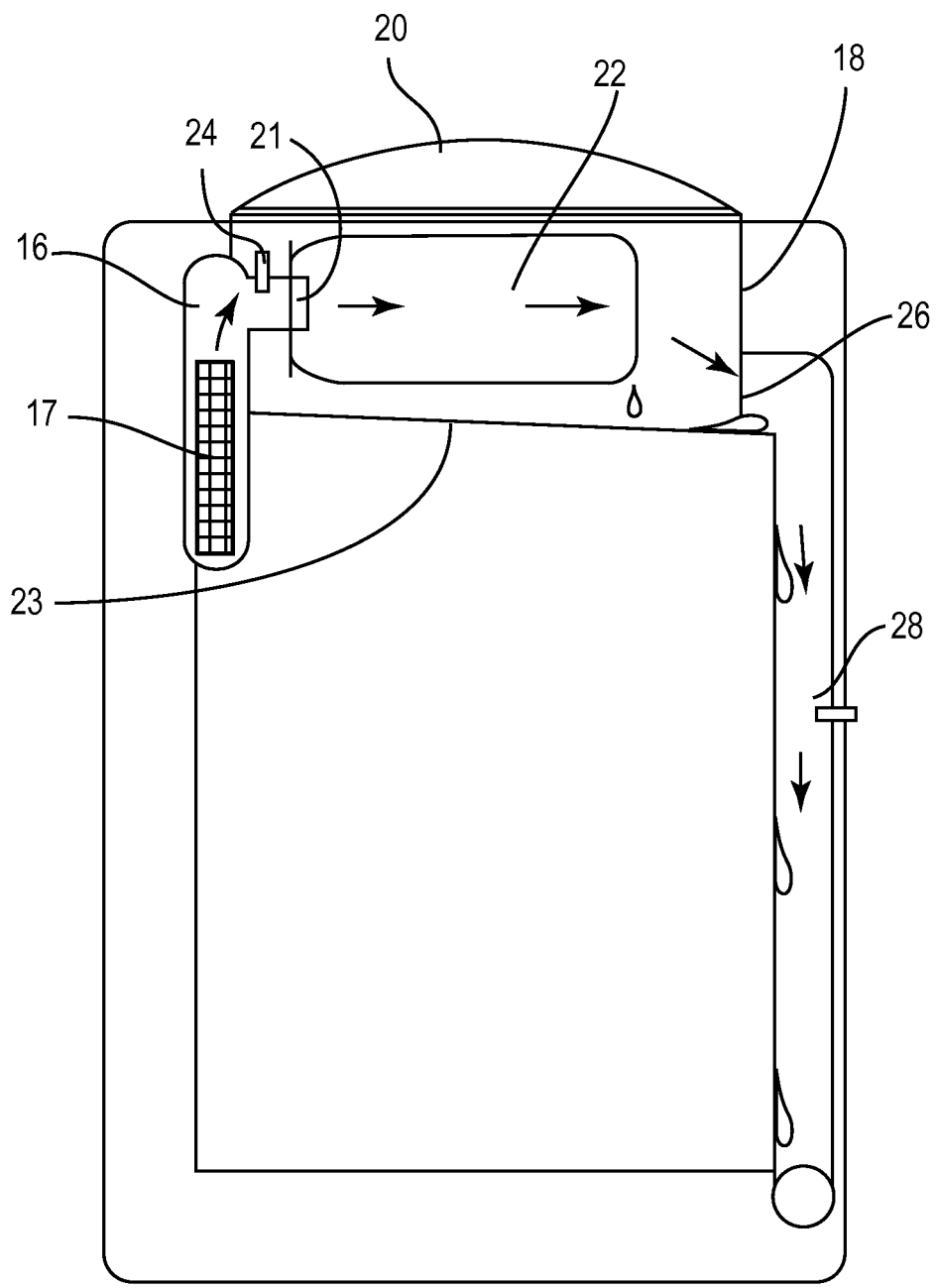
FIG. 2 is a side cross-sectional view of the clothes dryer in accordance with the present invention.

As shown in FIG. 2, the intermediate air channel 16 further includes an exit pipe 21 and an air flow sensor 24 in the exit pipe 21. Exit pipe 21 is a section of the intermediate air channel 16 on which a lint collector 22, to be discussed below, is coupled to the intermediate air channel 16. The air flow sensor 24 is an air flow meter that measures the actual speed of the air flowing through the intermediate air channel 16 in a defined time segment. The air flow sensor 24 works in conjunction with the fan 32, again, to be discussed in detail below. Additional air flow sensors 24 may be placed in locations along the closed loop of the dryer 10, including along the outlet pipe 28, to be described in detail below.

As shown in FIG. 2, the lint compartment 18 further comprises a lint compartment cover 20, the lint collector 22, mentioned above, that is housed within the lint compartment 18, and an angled lower surface 23. The lint compartment 18, as shown, is a rounded shape having a rounded upper and lower surface to assist in shedding moisture collected in the compartment 18. The lint compartment 18 is of sufficient size to house the lint collector 22. However, the lint compartment 18 can be of any shape sufficient to house the lint collector 22 therein and provide the proper moisture-shedding properties. The cover 20 can be detached from the lint compartment 18 so that the lint collector 22 can be replaced or cleaned as necessary. It is contemplated that the lint collector 22 is reusable. However, in the alternative, and if desired, the lint collector 22 can be used once, disposed of, and replaced. The cover 20 is positioned in the dryer 10 in such a position that the user can easily reach the cover 20 to detach it from the lint compartment 18. Then, after cleaning and/or replacing the lint collector 22, the cover 20 is reattached to the lint compartment 18. The seal between the lint compartment 18 and the cover 20 is airtight, or substantially airtight, to prevent air from seeping out of the lint compartment 18 that might reduce air flow speed. The cover 20 is dome-shaped, the practical application of the dome-shape will be explained below.

The lint collector 22 has an opening in the top portion thereof. The opening can be slid over, or coupled to, the exit pipe 21 to air-tightly seal the collector 22 onto the exit pipe 21. The seal between the exit pipe 21 and the lint collector 22 is strong enough to resist the force of the air flow pushing against the interior surface of the lint collector 22 as air enters the lint collector 22, fills the space within the lint collector 22, and exits the lint collector 22 through the lining of the lint collector 22, as shown by the arrows in FIG. 2. The opening in the lint collector 22 may be adjustable and adjusted to cinch the exit pipe 21 to create the seal. Or, in the alternative, the opening in the lint collector 22 may be fixed and stretched to cinch around the exit pipe 21 to create the seal.

Although the lint collector 22 is shown as a bag-type filter in the embodiment shown in FIG. 2, the lint collector 22 can be any type of filter that functions both as a lint filter and a steam condenser. As the air moves across and around the clothing within the drum 14, the air evaporates the moisture in the clothing and carries the moisture away from the clothing and into the intermediate air channel 16, past the air flow sensor 24, and into the lint collector 22 housed within the lint compartment 18. The moving air within the drum 14 also picks up small detached fibrous portions of threading in the clothing (i.e., lint) and moves them with the moist air into the lint collector 22. The lint collector 22 collects the lint out of the moving air by retaining the lint within the walls of the lint collector 22 while allowing the moving air to flow through the same walls. The lint collector 22 can be scented to emit a scent into the air flowing through the closed loop. By scenting the air flowing through the dryer 10, the clothes within the dryer 10 can also acquire the fresh scent or aroma of the lint collector 22. The lint collector 22 can be provided with any number of scents, from fruits to sweets and from perfumes to natural aromas. The scent on the lint collector 22 can be of varying strengths from faint to powerful. They can also be manufactured to have varying durations of usage, from one-time use to extended multiple-cycle use, upwards of 18-24 loads.

The lint collector 22 also functions as a condenser to condense the steamed moist air flowing through the lint collector 22. As the moist air and lint flow into the lint collector 22, the moist air begins to cool and condense. Once the moist air condenses enough, the moisture in the air forms water droplets that fall from the lint collector 22 and drop onto the angled lower surface 23 of the lint compartment 18. Also, because the cover 20, that is positioned substantially over the lint collector 22, is dome-shaped any moisture that condenses on the cover 20 runs down the dome and drips from the edges of the dome onto the angled lower surface 23, thus avoiding dripping directly onto the lint collector 22 from above. Embodiments of the dryer 10 include the domed cover 20 being continuously exposed to the ambient air, thus allowing the cover 20 to remain relatively cool and provide a relatively cooler surface upon which the moisture laden air within the lint compartment 18 can condense and collect. Moreover, any moisture that condenses elsewhere in the lint compartment 18, such as for example on the inner surfaces of the lint compartment 18, may collect and then drain onto the angled lower surface 23. Embodiments of the dryer 10 include one or more of the lint compartment 18, the lint collector 22, and the outlet pipe 28 being continuously exposed to the ambient air, whether physically positioned within or outside of the dryer 10, to further reduce the cooling and moisture collecting capabilities of these components.

The angled lower surface 23 is angled downward from front to back with respect to the dryer 10, which resultantly directs the water droplets that have dropped thereon to run from the point of contact with the angled lower surface 23 to the back of the lint compartment 18. At the back of the lint compartment 18, where the angled lower surface 23 ends, the lint compartment 18 couples to an opening 26 in the outlet pipe 28. The lint compartment 18, the angled lower surface 23, and the outlet pipe 28 are structurally configured to allow the water droplets running down the angled lower surface 23 to enter the outlet pipe 28 at the opening 26, as shown in FIG. 2. Moreover, the angled lower surface 23 may also be u-shaped to further assist the water droplets to accumulate at the bottom of the u-shape and transition toward the opening 26 in the outlet pipe 28.

To allow the lint collector 22 to have condenser-like properties, the lint compartment 18 can be insulated from the drum 14 such that the heat from the drum 14 does not interact with the lint collector 22 to heat the lint collector 22. Embodiments of the dryer 10 include the lint compartment 18 having an insulation layer provided under the bottom surface of the lint compartment 18, between the lint compartment 18 and the drum 14, to directly shield the bottom of the lint compartment 18 from the heat of the drum 14. Placing the insulation layer only on the bottom of the lint compartment 18 also allows heat from within the lint compartment 18 to dissipate out of the remaining surfaces of the lint compartment 18. Embodiments of the dryer 10 include the drum 14 having an insulation layer thereon to prohibit heat from the drum 14 interacting with the lint compartment 18. Embodiments of the dryer 10 include both the lint compartment 18 and the drum 14 each having an insulation layer or barrier placed thereon to prohibit the heat transfer directly between the drum 14 and the lint compartment 18. In these ways, the lint compartment 18 can remain relatively cool to provide condenser-like properties that allow the moisture-laden air within the lint compartment 18 to condense.

Moreover, if needed, outside ambient air can be channeled into the lint compartment 18 through an opening in the lint compartment 18 to further cool the lint compartment 18 to assist in condensing the moist air therein. Embodiments of the dryer include the lint compartment 18 having a fan positioned in an exterior surface of the lint compartment 18 to force relatively cool ambient air into the lint compartment. Such a fan would permit air to flow into the lint compartment 18 and prohibit the moisture-laden air from escaping thereby.

Further in addition, the lint collector 22 can have an interior surface and an exterior surface. The interior surface and the exterior surface may be comprised of differing fabrics or materials having differing moisture-related properties. For example, and not to limit the disclosure of the invention, the interior surface of the lint collector 22 can be a mesh-like filter to catch and retain the lint in the moist air while permitting the moisture to pass therethrough, whereas the exterior surface can be configured of materials or surface structure to encourage the moist air to attach, cool, and condense thereon. Once accumulated, the condensed water may drop onto the angled lower surface 23 therebelow. Embodiments of the dryer 10 may include the lint collector 22 being constructed of fabrics and materials that quickly and easily absorb and release moisture, such as, but not limited to, corduroy, silk, wool, or acrylic. Such fabrics could allow moisture to collect and over time accumulate to thereafter drop to the lower surface 23. Embodiments of the lint collector 22 may include the lint collector 22 being constructed of fabrics and materials that do not easily or quickly absorb moisture, such as, but not limited to, nylon, acetate, or polyester. Such fabrics could allow moisture to collect and quickly drop to the lower surface 23. Embodiments of the lint collector 22 may include the lint collector 22 being constructed of fabrics and materials that are especially efficient at collecting moisture in the air, such as, but not limited to, polypropylene or polyethylene. Such fabrics can be configured in the shape of nets. Such fabrics could allow the lint collector 22 1o more efficiently collect the moisture in the air within the lint collector 22 and subsequently shed the collected moisture to the lower surface 23. Embodiments of the lint collector 22 may include the lint collector 22 being made of multiple layers of the same material having different weave patterns or weave patterns that are similar but offset from layer to layer. The moisture can collect more efficiently between multiple layers.

Figure 3:
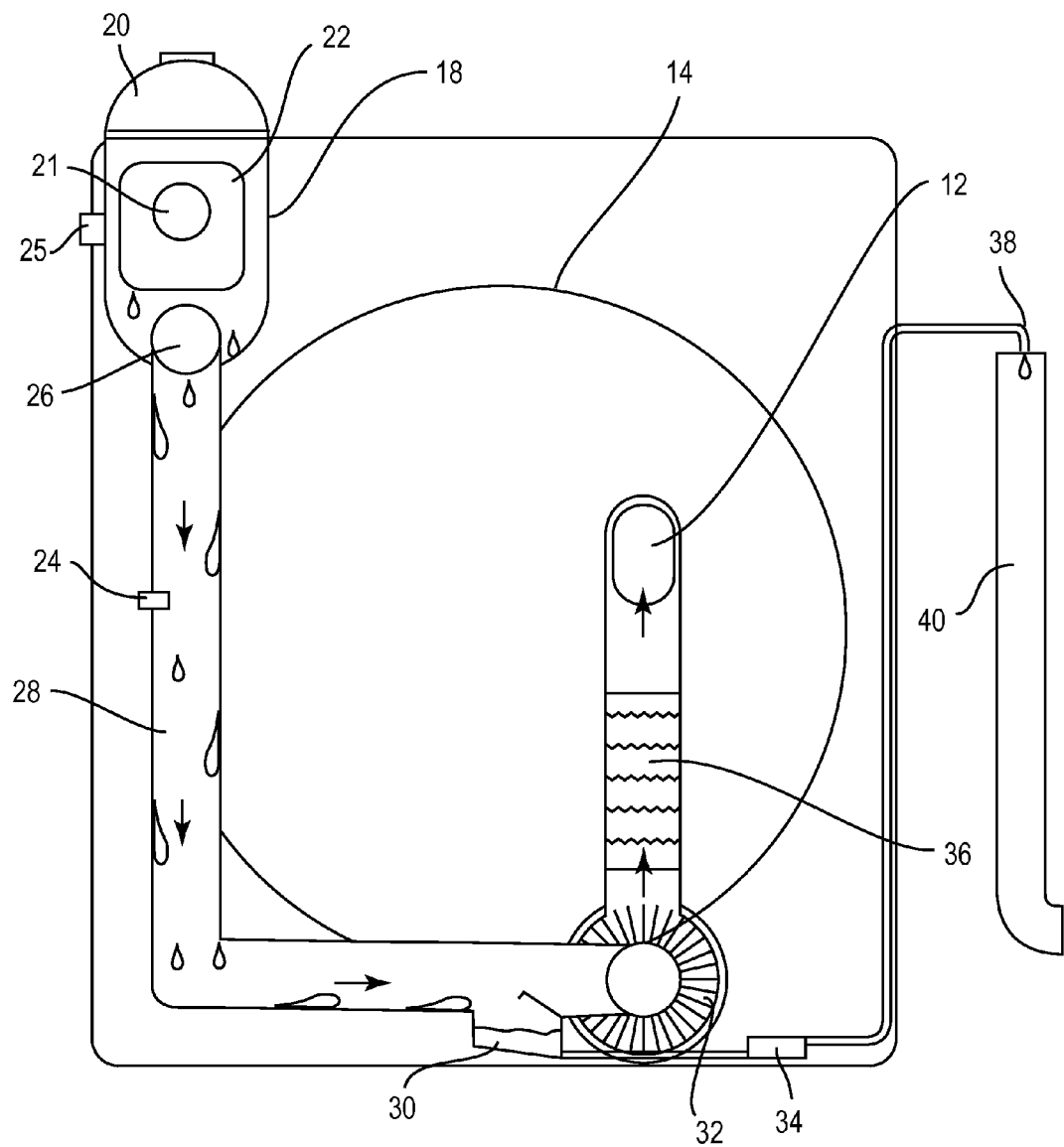
FIG. 3 is a rear cross-sectional view of the clothes dryer in accordance with the present invention.

Upon entering the outlet pipe 28, the water droplets travel through the outlet pipe 28 by gravity to the moisture trap 30 located at a bottom portion of the pipe 28 and at a bottom portion of the dryer 10, as shown in FIG. 3. Embodiments of the dyer 10 include the outlet pipe 28 also being insulated from the drum 14, such that the heat within the drum 14 does not interact with the outlet pipe 28 and the outlet pipe 28 remains sufficiently cool to collect moisture within the closed loop. In this way, the outlet pipe 28 assists in the condensation of the moisture in the air flowing through the closed loop. As moist air flows down and through the outlet pipe 28, the moisture in the air can adhere to the cooler walls of the outlet pipe 28 and additional water droplets form and the existing water droplets become larger.

Because the moisture trap 30 is located at the bottom portion of the outlet pipe 28, the moisture flows by gravity into the moisture trap 30 and is retained therein. The water in the moisture trap 30 is then pumped out of the closed loop by a pump 34. The pump 34 pumps the water out of the moisture trap 30, through a water line 38, and into a drain 40 associated with the washer, or other like water drain, to remove the moisture from the closed loop. As disclosed, the pump 34 is a magnetic drive pump, but the pump 34 may be of any type or variety that functions to remove the water from the moisture trap 30 and pumps it into the exterior drain 40.

Along with the water droplets that flow through the outlet pipe 28, the air that has exited from the lint collector 22 also flows into the outlet pipe 28. The air enters the outlet pipe 28 at the opening 26 and flows through the outlet pipe 28, over the moisture trap 30, and into the fan 32, mentioned above.

The fan 32 functions to force the air through the dryer 10 to achieve the intended operation. When actuated, the fan 32 drives the air, within the closed loop, up and through a heating element 36, which heats the air to a desired upper temperature. The heated air thus enters the drum 14 through the air inlet 12 and the heated air begins to dry the clothing in the drum 14. Because the air that passes through heating element 36 is heated, enters the drum 14, and evaporates the moisture in the clothing within the drum 14, the heated air provides the additional benefit that the heated steam kills bacteria and creates an environment that reduces the wrinkles in the load of clothing in the drum 14 as the clothing is dried.

The fan 32 drives the heated air within the drum 14 through the intermediate air channel 16, through the lint compartment 18 and the lint collector 22, through the outlet pipe 28 and back into the fan 32. The process then repeats itself until the clothes are dry or the dryer 10 is finished with its requested cycle. A sensor 13 senses the dryness of the clothes within the drum 14 and operates to shut down the dryer 10 when the sensor 13 measures that the clothes are dry. The sensor 13 measures the humidity of the air within the closed loop to measure whether the clothes are dry. The sensor 13 also functions to estimate the time remaining before the clothes within the drum 14 are dry. The sensor 13 can thus accurately measure the wetness and/or dryness of the clothes and can adjust the time remaining to dry the clothes whether the load of clothes is large or small. The sensor 13 may also communicate with the valve 25 to open or close the valve 25, as needed, as will described in greater detail below. The dryer 10 can also display the time remaining.

Because the dryer 10 of the present invention uses air that has been cycled through the closed loop and has thereby already been heated above a predetermined temperature, and at the very least above the temperature of the ambient air, the heating element 36 does not have to constantly be activate to maintain acceptable temperature levels that will dry the clothing within the drum 14. Indeed, a temperature sensor located within the fan 32, or between the fan 32 and the heating element 36, monitors the temperature of the air within the closed loop. By monitoring the air, the heating element 36 can turn off when the air is measured at a temperature that is within a desired temperature range. For example, the upper limit of the desired temperature range could be between 160 and 190 degrees Fahrenheit, whereas the lower limit of the desired temperature range could be between 140 and 180 degrees Fahrenheit. In alternative embodiments the upper limit can be set at 180 degrees Fahrenheit and the lower limit can be set at 170 degrees Fahrenheit. When the temperature of the air is within this predetermined range, the heating element 36 does not need to consume energy to heat the air. Indeed, when the air within the closed loop reaches the upper limit of the desired temperature range, the heating element 36 can be automatically turned off. Then, if the air within the closed loop cools to below the lower limit of the desired temperature range, the heating element 36 can be automatically activated to heat the air back up to the upper limit, or at least to within the predetermined temperature range. By not having to constantly run the heating element 36 to constantly heat the air entering the drum 14, the dryer 10 conserves energy.

Also, to assist in conserving energy, the speed of the fan 32 can be adjusted according to the needs of a particular load of laundry within the drum 14. Specifically, the speed of the fan 32 can be automatically adjusted in accordance with the measurement of the speed, or rate, of the air flowing through the closed loop measured by the air flow sensor 24. The air flow sensor 24 may also be configured to measure the amount of lint within the lint collector 22, by measuring the rate of airflow into or out of the lint collector 22, which has a direct impact on the air flow through the entire closed loop.

The dryer 10 can be set with a predetermined air flow speed requirement for proper drying of the clothes within the drum 14. As conditions change within the closed loop of the dryer 10, such as the air pressure and air flow increasing or decreasing, the speed of the fan 32 can be adjusted in accordance with the measurement taken by the air flow sensor 24, thus using only the amount of energy to power the fan 32 as is necessary. For example, for light loads, for loads with little lint, or for relatively dry loads, the fan 32 would not have to work as hard to maintain the requisite air flow, as measured by the air flow sensor 24, through the closed loop to properly dry the clothes. As a result, the fan speed could be diminished, thus diminishing the consumption of energy to power the fan 32. Additionally, where the load of clothing in the drum 14 is large or substantially wet, the fan 32 may adjust its power consumption to adjust its rotational speed to maintain the requisite air flow, as measured by the air flow sensor 24, through the closed loop. In this way, although the fan 32 is always on, the dryer 10 supplies the appropriate power to the fan 32 when needed, and also conserves power to the fan 32 when not needed. As an added feature, if the air flow sensor 24 measures a reduced or restricted air flow within the closed loop that falls below a certain predetermined level, likely due to the lint collector 22 being full, the air flow sensor 24 can communicate with both the fan 32 and the dryer 10 to shut down to avoid overworking or overloading the dryer 10. Also, in this condition, the air flow sensor 24 prohibits future operation of the dryer 10 until the lint collector 22 is changed.

Also, as shown in FIG. 3, the dryer 10 further comprises a time-activated air inlet valve 25 that operates to allow ambient air, which is relatively cooler in temperature than the heated air within the cycle, to enter the closed loop of the dryer 10 at certain predetermined times during the drying cycle, if desired. The time-activated air inlet valve 25 can be positioned in a surface of the lint compartment 18. However, the time-activated air inlet valve 25 can also be positioned in other locations along the closed loop, for example, in the outlet pipe 28. Further, multiple time-activated air inlet valves 25 can be positioned at various positions along the closed loop to further facilitate the condensation of the moisture within the closed loop. The time-activated air inlet valve 25 can operate, for example, to allow relatively dry and cooler ambient air to enter the closed loop during the drying cycle to cool the air within the closed loop, to cool the lint compartment 18, to cool the outlet pipe 28, and/or to cool other components of the dryer 10 which might facilitate additional condensation of the moisture within the closed loop. Also, the time-activated air inlet valves 25 can operate during the latter stages of the drying cycle of the dryer 10 to cool down the air within the closed loop prior to the dryer completing the requested operational cycle to ensure the clothes are relatively cool prior to the user reaching into the drum 14 to remove the clothing upon completion of the cycle. Also, the time-activated air inlet valves 25 can operate to speed up the drying time of the load of clothing within the drum 14 by introducing the dry ambient air into the closed loop, which thus reduces the relative humidity within the closed loop and allows the air within the closed loop to evaporate more moisture from the clothing in the drum 14. Also, as mentioned above, the ambient air also speeds up the drying time by cooling the air within the closed loop and allowing some of the moisture to condense and travel to the trap 30 and be pumped out of the dryer 10 and into the drain 40.

A control unit having a processor, RAM, memory, and accompanying software and hardware components may control the operation of and interaction between the fan 32, the heating element 36, the pump 34, the sensors 24, the sensor 13, the valve 25, the dryer 10, and any other components not specifically listed here but described herein that one of ordinary skill in the art would understand to be controlled by the control unit, as described herein. The control unit may be set by a user to run a specific pre-programmed cycle stored in the memory and the control unit may thereafter automatically run the cycle according to the selected program.

In view of the above, the cost of drying clothes in the dryer 10 of the present invention is between $0.22 and $0.45 per load, whereas the cost of drying clothes in the traditional exhaust dryer is between $0.60 and $1.40 per load. The cost of drying clothes in the dryer 10 of the present invention is approximately 3 to 7 times cheaper than drying clothes in the traditional dryer. Moreover, because the dryer 10 operates with heated steam within a closed loop and the lint collector 22 within the lint compartment 18 collects the lint from the clothing, the dryer 10 reduces the likelihood of fire and reduces the amount of carbon dioxide produced to the atmosphere.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A clothes dryer comprising:
   a drum configured to hold an article;

a lint compartment in communication with the drum and set apart from the drum;
a heating element;
a fan; and
a circuit loop, wherein the drum, the lint compartment, the heating element, and the fan form part of the circuit loop,
the fan being configured to move air through the circuit loop,
the heating element being configured to heat the air in the circuit loop, the heated air passing over the article to draw moisture out of the article and into the air,
the lint compartment being configured to receive the moist air from the drum, to filter lint from the moist air that leaves the drum, and to collect the moisture from the moist air before the resulting drier air returns to the fan,
wherein the lint compartment comprises a domed upper surface having an outer surface and an inner surface, the outer surface being exposed to the ambient air such that the inner surface achieves a temperature that allows the inner surface to collect the moisture in the lint compartment.

2. The clothes dryer of claim 1, wherein the clothes dryer further comprises an outlet pipe having interior walls, wherein the outlet pipe forms part of the circuit loop and is positioned between the lint compartment and the fan, the outlet pipe being configured to receive the moisture collected in the lint compartment, to collect moisture on the interior walls, and to transport the moisture to a moisture trap.

3. The clothes dryer of claim 1, wherein the outlet pipe is insulated from the drum.

4. The clothes dryer of claim 1, wherein the lint compartment is insulated from the drum.

5. The clothes dryer of claim 1, wherein the clothes dryer further comprises an air flow sensor, the air flow sensor being positioned in the circuit loop and configured to measure the flow of air through the circuit loop and adjust the speed of the fan based on the measured airflow.

6. The clothes dryer of claim 1, wherein the clothes dryer further comprises a humidity sensor and an air inlet valve, the humidity sensor being configured to measure the moisture within the circuit loop and the air inlet valve being positioned on the lint collector and configured to open or close to permit ambient air to enter the circuit loop based on the measured humidity.

7. The clothes dryer of claim 1, wherein the heating element is configured to operate to heat the air within the circuit loop to a temperature within a predetermined temperature range and to shut off under the condition that the air is within the predetermined range.

8. A clothes dryer comprising:
a drum configured to hold an article;
a lint compartment in communication with the drum and set apart from the drum;
a heating element;
a fan; and
a circuit loop, wherein the drum, the lint compartment, the heating element, and the fan form part of the circuit loop,
the fan being configured to move air through the circuit loop,
the heating element being configured to heat the air in the circuit loop, the heated air passing over the article to draw moisture out of the article and into the air,
the lint compartment being configured to receive the moist air from the drum, to filter lint from the moist air that leaves the drum, and to collect the moisture from the moist air before the resulting drier air returns to the fan,
wherein the lint compartment further comprises:
a domed upper surface having an outer surface and an inner surface, the outer surface being exposed to the ambient air such that the inner surface achieves a temperature that allows the inner surface to collect the moisture in the lint compartment;
a sloped bottom surface that receives the collected moisture and transitions the moisture out of the circuit loop; and
a lint collector positioned within the lint compartment without contacting interior walls of the compartment, the lint collector being configured to filter the lint from the air and to collect moisture in the air that enters the lint compartment; and
an air inlet valve configured to communicate with ambient air to permit ambient air to enter the circuit loop to cool the lint compartment.

9. The clothes dryer of claim 8, wherein the clothes dryer further comprises an outlet pipe having interior walls, wherein the outlet pipe forms part of the circuit loop and is positioned between the lint compartment and the fan, the outlet pipe being configured to receive the moisture collected in the lint compartment, to collect moisture on the interior walls, and to transport the moisture to a moisture trap.

10. The clothes dryer of claim 8, wherein the lint compartment is insulated from the drum.

11. The clothes dryer of claim 9, wherein the outlet pipe is insulated from the drum.

12. The clothes dryer of claim 8, wherein the clothes dryer further comprises an air flow sensor, the air flow sensor being positioned in the circuit loop and configured to measure the flow of air through the circuit loop and adjust the speed of the fan based on the measured airflow.

13. The clothes dryer of claim 8, wherein the clothes dryer further comprises a humidity sensor, the humidity sensor being configured to measure the moisture within the circuit loop and communicate with the air inlet valve to open or close the air inlet valve based on the measured humidity.

* * * * *